United States Patent Office 2,748,091
Patented May 29, 1956

2,748,091
CELLULOSE DERIVATIVE COMPOSITIONS

Arthur L. Allewelt, West Chester, Pa., assignor to American Viscose Corporation, Philadelphia, Pa., a corporation of Delaware No Drawing. Original application April 1, 1952, Serial No. 279,922. Divided and this application May 8, 1953, Serial No. 353,902

15 Claims. (Cl. 260—17)

This invention relates to compositions comprising thiourethanes of acyl esters of cellulose such as thiourethanes of cellulose acetate, and extruded and molded articles comprising them. This application is a division of my copending application Serial No. 279,922, filed April 1, 1952.

In the thiourethanes of cellulose acyl esters of the compositions of the invention, some hydroxyl groups of the cellulose molecule are replaced by acyl groups

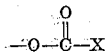

and thiourethane groups

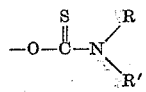

in which X represents an alkyl radical containing from 1 to 16 carbon atoms, R and R' are each selected from the group consisting of hydrogen, a saturated or unsaturated aliphatic hydrocarbon group containing from 1 to 12 carbon atoms, an alicyclic radical having a total of not more than 12 carbon atoms and comprising a single 4- to 6-membered carbocyclic ring, a heterocyclic radical having a total of not more than 12 carbon atoms and comprising a single 5- to 6-membered ring, an aryl radical of the benzene series, and an aryl radical of the benzene series having aliphatic hydrocarbon groups containing a total of not more than six carbon atoms attached to the benzene ring, R and R' being the same or different. The term "cellulose" when used herein includes celluloses having any average molecular weight or degree of polymerization, such as a D. P. of 50 to 400 or more.

While the ratios of the thiourethane and the acyl groups to the anhydroglucose units in the cellulose derivatives may vary, in the preferred embodiment the ratio of thiourethane groups to anhydroglucose units is from 1:3 to 1:10, most desirably about 1:3 to 1:6, and the ratio of acyl groups to anhydroglucose units is from 1:1 to 1.75:1.

These esters may be obtained by the methods disclosed in my earlier application supra and the disclosure thereof is incorporated herein by reference.

The cellulose thiourethanes which are acylated may be produced by any suitable method. They may be obtained by reacting a primary or secondary amine with a xantho-fatty acid resulting from the reaction of cellulose xanthate and a monohalogenated fatty acid, e. g., chloracetic acid. Preferably, however, the thiourethane is obtained by the process described in my pending application Serial No. 65,742, filed December 16, 1948, now Patent No. 2,705,231, issued March 29, 1955, and the disclosure thereof incorporated herein by reference. That process which yields products which do not contain free carboxyl groups and are therefore colorless or substantially colorless, involves reacting viscose with a water-soluble salt of a di- or tri-valent metal, e. g., zinc sulfate, in aqueous solution containing sodium sulfate, to form a complex which is then dispersed in an aqueous solution of a primary or secondary amine to produce the cellulose thiourethane.

Cellulose thiourethanes which may be acylated to produce the esters described herein include cellulose thiourethane, cellulose phenylthiourethane, cellulose ethylthiourethane, cellulose amylthiourethane, cellulose mono- and di-benzyl thiourethanes, cellulose allyl- and methallyl-thiourethanes, cellulose cyclohexylthiourethane, cellulose dibutylthiourethane, cellulose dimethylthiourethane, cellulose pyridylthiourethane, etc.

The acid anhydrides which may be used in acylating the cellulose thiourethane are the anhydrides of the fatty acids containing from 2 to 16 carbon atoms, i. e., acids of the aliphathic series from and including acetic acid to and including stearic acid.

These new esters are colorless or essentially colorless powders which are variously soluble in organic solvents, exhibit plastic properties, and receptivity for the acid dyestuffs. They find important use in the plastic and coating arts alone or as modifying components of plastic compositions.

In general, the esters have softening temperatures between 200 and 260° C. and exhibit good flow characteristics under pressure at temperatures between 170° C. and 210° C. Thus, with or without the addition of a plasticizing agent, the esters may be heated under pressure to between 170° C. and 210° C. and extruded by means of conventional extruding devices to form shaped articles. For example, a thiourethane of the cellulose ester or a mixture of the thiourethanes of cellulose esters may be placed in a heated cylinder and when reduced to a melt under pressure may be forced through a spinneret by means of a piston, to form filaments or threads. Or the ester may be fed into a screw mixer-extruder and extruded as a translucent cylindrical rod which is broken into small pieces and fed into a screw extruder from which it is forced through the orifices of a spinneret or other shaping means, to obtain filaments, films, tapes, ribbons, tubes, bands, etc. The melt may be extruded under pressure onto a supporting surface to form a pellicle which is subsequently stripped off the support or it may be extruded onto a substrate to which it is adhered or anchored with the aid of pressure, thus producing a composite product, for instance, composite sheet material.

Also the thiourethanes of the cellulose acyl esters may be molded by compression or injection molding techniques to obtain massive molded articles of any desired size and cross-section.

Compositions comprising the thiourethanes of the cellulose acyl esters may be formed by dissolving them in a suitable solvent and such compositions may be formed into filaments or threads by wet- or dry-spinning methods, cast to films, or otherwise shaped with evaporation or extraction of the solvent. The solutions may further be used as coating compositions, for laminating similar and dissimilar surfaces, as adhesives, etc.

Many of the thiourethanes of the acyl esters of cellulose which come within the scope of the invention are soluble in acetone, dimethylformamide, and dimethylacetamide, or in at least one of the solvents mentioned. Solutions thereof in such solvents may be used.

The thiourethanes of the esters may be merely swollen or plasticized by the mentioned solvents to obtain plastic, readily workable masses.

Since the thiourethanes of the cellulose esters have plastic or flow characteristics under heating and are compatible with such plastic materials as cellulose acetate and resins, of which the thermoplastic resins are particularly suitable, they may be blended with those base materials in varying amounts depending upon the limits of compatibility of the ester of the cellulose thiourethane with the particular thermoplastic base material to impart to the shaped article, coating or the like, receptivity for the acid wool type dyestuffs.

Mixtures of commercial cellulose acetate and one or more of the thiourethanes of cellulose acyl esters of the invention may be dissolved in acetone, dimethylformamide or dimethylacetamide, or the thiourethane of the ester may be added to a solution of cellulose acetate in one of the mentioned solvents and spun into filaments having essentially the properties of normal cellulose acetate filaments but distinguished therefrom by a capacity to accept the acid dyestuffs without the use of dyebaths containing large proportions of special assistants or swelling agents for the acetate.

The thiourethanes of cellulose acyl esters also may be mixed with natural and at least initially thermoplastic synthetic resins and extruded or molded by known methods. The components of these compositions may be mixed in solution and extruded or the dry finely divided ingredients may be mixed in a Banbury mixer or on milling rolls and dissolved in a solvent, the solution being then extruded. Or the dry, finely divided ingredients may be compounded with or without preliminary shaping to convenient pellet form, and molded by injection or compression molding techniques.

In molding the thiourethanes of the acylated cellulose or mixtures thereof with other plastic materials, various molding adjuvants may be introduced into the molding composition and in the case of mixtures of the thiourethanes of the esters and other plastic moldable substances the adjuvants, which may be fillers, plasticizing agents, dyes, pigments, mold lubricants, special effect materials such as metallic particles, etc., may be mixed with either of the primary components before they are mixed together or conjointly with compounding thereof. As fillers there may be used alpha-cellulose, wood flour, walnut shell flour, asbestos in the form of a powder or long or short fibers, finely divided silicon carbide, carbon black, diatomaceous earth, slate dust, powdered rutile, powdered or flake mica, powdered quartz, fibers or cloth cuttings (e. g., fibers or cuttings of silk, rayon, wool, linen, cotton, nylon, glass fibers or cuttings of cloth made therefrom, fibers of polymeric or copolymeric acrylonitrile or cloth made therefrom), ground cork, sand, etc.

As plasticizers there may be used phthalic acid esters including dimethyl, diethyl, dimethyl glycol, diethyl glycol, dibutyl glycol and dioctyl phthalates, triethyl citrate, cresyl glyceryl diacetate, triacetin, etc.

As mold lubricant there may be used zinc stearate, calcium stearate, mixtures thereof and natural and synthetic waxes.

Many thermoplastic resins may be modified by admixture with the acyl esters of the cellulose thiourethanes, including the polyamides such as nylon and polyesters particularly polymethylene terephthalates, and the synthetic thermoplastic resins obtained by the polymerization or interpolymerization of one or more polymerizable unsaturated monomers containing monoethylenic unsaturation. Examples of these resins are polystyrene, polyethylene, polymethylmethacrylate, polyvinyl chloride, polyvinylidene chloride, copolymers of vinyl chloride and vinyl acetate, and copolymers of vinyl chloride and vinylidene chloride (e. g., the product available commercially under the trade name "Saran").

A specific preferred group of synthetic resins for admixture with the thiourethanes of the acyl esters of cellulose are those acrylonitrile polymers containing, in the polymer molecule, at least 50% by weight of acrylonitrile. The polymer may be the homopolymer polyacrylonitrile or a copolymer resulting from the copolymerization or interpolymerization of acrylonitrile with one or more other monoethylenically unsaturated monomers copolymerizable with acrylonitrile those copolymers which are of thermoplastic character being especially valuable for molding purposes.

Monomers which may be copolymerized with acrylonitrile to produce binary or ternary copolymers to be mixed with the thiourethanes of the cellulose acyl esters include: acrylic, alpha-chloracrylic and methacrylic acids; methyl methacrylate, ethyl methacrylate, butyl methacrylate, octyl methacrylate, 2-nitro-2-methylpropyl methacrylate, methoxymethyl methacrylate, beta-chlorethyl methacrylate and the corresponding esters of acrylic acid and alpha-chloracrylic acids; vinyl chloride, vinyl fluoride, vinyl bromide; vinylidene chloride, 1-chloro-1-bromoethylene, vinylidene bromide, 1-fluoro-1-chlorethylene, 1,1-difluoroethylene; methacrylonitrile, alpha-chloracrylonitrile; acrylamide, methacrylamide, N,N-dimethylacrylamide, alpha-chloracrylamide, or monoalkyl substitution products thereof; methyl vinyl ketone and methyl isopropyl ketone; vinyl carboxylates such as vinyl acetate, vinyl chloracetate, vinyl propionate and vinyl stearate; N-vinylimides such as N-vinyl phthalimide and N-vinylsuccinimide, methylenemalonic esters; itaconic acid and itaconic esters; trifluorochlorethylene; N-vinyl carbazole and vinyl-substituted heterocyclic amines such as the vinylpyridines including those having hydrocarbon groups containing a total of not more than four carbon atoms attached to the pyridine nucleus, e. g., 2-vinylpyridine, 2-methyl-5-vinylpyridine, vinylimidazoles, e. g., 1-vinylimidazole, N-vinylimidazole, 1-vinyl-2-methylimidazole, etc.; vinyl furane; butyl vinyl sulfone, ethyl vinyl sulfone; ethylene, propylene, isobutylene, butene-1 and butene-2; alkyl vinyl ethers; vinyl-sulfonic acid; ethylene-alpha, beta-dicarboxylic acids or their anhydrides or derivatives such as diethyl fumarate, diethyl maleate, diethyl citraconate, diethyl mesaconate; styrene, vinyl-naphthalene, and the like.

The thiourethanes of the acylated cellulose are particularly advantageous as blending or modifying agents for polyacrylonitrile and copolymers thereof which, of themselves, exhibit little or no receptivity for the acid dyes. Blends of those acrylonitrile polymers with the thiourethanes of the cellulose esters can be extruded or molded to obtain shaped articles which are receptive to the acid dyes and can be dyed to satisfactory shades under usual wool-dyeing conditions.

While the proportion of acrylonitrile in the polymer molecule is at least 50% by weight, it is frequently much higher depending on the ultimate use of the blend comprising the polymer. If the blend is to be spun from a solution to form filaments or threads, the copolymer should contain at least 80% by weight of acrylonitrile in the polymer molecule, and not in excess of 20% by weight of the other monomer or monomers. Binary copolymers containing by weight in the polymer molecule, from 85% to 99% acrylonitrile and 1% to 15% of another monomer such as mentioned above, and ternary polymers containing, by weight in the polymer molecule, at least 80% acrylonitrile and from 1 to 19% each of two of the other monomers which are copolymerizable with acrylonitrile, and in which the three components total 100%, are preferred for fiber-forming purposes.

The acrylonitrile polymers high in polymerized acrylonitrile including polyacrylonitrile itself are soluble in such organic solvents as dimethylformamide and dimethylacetamide. Since those solvents also dissolve the thiourethanes of the cellulose esters, notably the phenyl thiourethane of acetyl cellulose, they may be used in preparing spinning and casting solutions of the mixture of polymer and cellulose ester thiourethane.

Acrylonitrile polymers containing less than 80% by weight of acrylonitrile in the polymer molecule are generally soluble in common solvents which do not dissolve the polymers containing the higher proportions of polymerized acrylonitrile. or example, they are generally soluble in acetone which is also a solvent for many of the new thiourethanes of acyl esters of cellulose. Mixtures of the polymers containing less than 80%, but not less than 50%, by weight of polymerized acrylonitrile with a thiourethane of an acyl ester of cellulose as described herein, for example, a phenylthiourethane of acetyl cellulose may be dissolved in acetone and cast into films, applied as coatings, and so forth.

The molecular weight of the thermoplastic resin mixed with the thiourethane of the cellulose may vary rather widely, depending on the use to which the mixture is to be put. Preferably, the resin has a molecular weight of at least 5,000, but when the composition comprises a mixture of a thiourethane of acyl cellulose and a polymeric material containing at least 80% polymerized acrylonitrile which is to be formed into filaments or yarns, higher molecular weights are desirable and the acrylonitrile polymers may have a molecular weight up to 250,000 or even higher.

The following examples, in which the parts given are by weight unless otherwise specified illustrate specific embodiments of the invention. The Rockwell hardness value given in some of the examples was measured on the well-known Rockwell hardness tester.

Example 1

Fifty parts of an allyl thiourethane of cellulose containing one allyl thiourethane group per three anhydroglucose units were pretreated with 465 parts of glacial acetic acid at 25° C. for 24 hours. The mixture was then placed in a mixing Pfleiderer and chilled to 15° C. with continuous mixing. An acetylating mixture of 202 parts of 98% acetic anhydride and 2.64 parts of 95.5% sulfuric acid, chilled to between 5 and 10° C., was added to the acid-swollen cellulose allylthiourethane in increments over a period of 10 minutes. The reaction mixture was held at between 33° C. and 35° C. for 3 hours, after which there was added to it, slowly and continuously, a mixture of 122.5 parts of water, 122.5 parts of glacial acetic acid and 2.64 parts of 95.5% sulfuric acid, the temperature being maintained at between 30° C. and 35° C.

The reaction mixture was then removed from the mixing vessel and stored at 50° C. for ripening. Portions of the solution were removed at intervals during the ripening, the ester in each being precipitated as a white powder, washed and dried. The esters were analyzed for combined acetyl with the following results.

| Ripening Time (hours) at 50° C. | Acetyl Calculated as Percent Acetic Acid |
| --- | --- |
| 48 | 45.82 |
| 120 | 35.31 |
| 168 | 32.45 |
| 288 | 26.86 |

Example 2

Ten parts of the ester obtained by ripening the acetylation product of Example 1 for 288 hours at 50° C. were mixed with 90 parts of polystyrene. The mixture was placed in a cylindrical compression mold having a diameter of 1.25 inches. The mold was placed in a hydraulic press, heated by band heaters to 200° C., and then subjected to a pressure of 4000 lbs./sq. inch for 2 minutes. A translucent rod was obtained.

A standardized dyebath was prepared by dissolving 5% of Glauber's salt, 3% of sulfuric acid (96%) and 2% of the acid dye Wool Fast Scarlet G. Supra (C. I. No. 252) (the percentages being on the weight of the article to be dyed) in water. The molded rod was entered into the bath at 55° C., the bath was brought to the boil in 10 minutes, and boiled for 20 minutes. The rod was dyed to a good red shade. In another run, dioctyl phthalate was added to the blend of polystyrene and cellulose ester allylthiourethane, making possible a somewhat lower molding temperature.

Example 3

About 78.52 parts of a cellulose phenylthiourethane containing one phenylthiourethane group per three anhydroglucose units were placed in a vessel equipped with mixing blades, 392 parts of acetic acid at 80° C. were added, and the mixture was agitated for one hour at 80° C. The temperature was then reduced to 16° C. and an acetylating medium chilled to 10° C. and consisting of 314.08 parts of acetic anhydride and 3.92 parts of 100% sulfuric acid was added slowly until the temperature began to rise above 20° C. Addition of the acetylating mixture was stopped until the rise in temperature of the reaction mixture subsided. The remainder of the acetylating medium was then added and the reaction was allowed to proceed for two hours at between 33° C. and 35° C., after which a mixture of 76.2 parts of water, 76.2 parts of glacial acetic acid and 4.18 parts of 100% sulfuric acid was added. During the addition of the last-mentioned mixture the temperature of the mass rose to 52° C. and then gradually fell to 35° C. over a period of 30 minutes. The reaction mixture was removed to a glass container, and aged by storing it at 35° C. for 264 hours. The mixture was then divided into portions which were further ripened to varying extents by storing them at 50° C. for between 48 and 120 hours. Esters were isolated from the reaction mixtures in the form of white powders by the addition of water, and were found to contain between 24.59 and 25.56% combined acetic acid respectively, which correspond to a degree of substitution of 1.4 to 1.45 acetyl groups per anhydroglucose unit. The precipitated products were filtered, washed free of acid, and dried at 60° C. for 24 hours. These products were soluble in acetone, dimethylformamide and dimethylacetamide.

Example 4

From 10 to 30% of the acetyl esters of cellulose phenylthiourethane of Example 3 were added to different batches of commercial cellulose acetate spinning dope using acetone as the solvent. The mixtures were dry-spun in accordance with the conventional cellulose acetate dry spinning procedure. The fibers obtained were dyed to a deep fast shade in a bath prepared as described in Example 2.

Example 5

Ten parts of a phenylthiourethane of cellulose containing one phenylthiourethane group per three anhydroglucose units were stirred with 90 parts of glacial acetic acid at 25° C. for 168 hours. The product was filtered and washed free of acid with water at room temperature. The mass was continuously stirred during the washing, and filtered between each washing. The purified product contained 4.06% combined acetic acid. It was soluble in dimethylformamide and dimethylacetamide, insoluble in acetone.

Example 6

The thiourethane ester of Example 5 was added to different batches of a spinning dope comprising commercial cellulose acetate (54.6% acetyl) dissolved in dimethylformamide in amounts between 15 and 25%.

Films and fibers formed from the mixtures in the usual way were dyed to a good deep shade in a dyebath as in Example 2.

Example 7

A mixture of 67.1 parts of an ethylthiourethane of cellulose containing one ethylthiourethane group per 3.75 anhydroglucose units and 662.9 parts of water was extracted with glacial acetic acid until all the water was replaced by the acetic acid. The mass was dried in a vacuum dessiccator over phosphorus pentoxide for 18 hours after which the mixture of 67.1 parts cellulose ethylthiourethane and 633 parts glacial acetic acid was placed in a vessel equipped with mixing blades and chilled to 15° C. with continuous mixing. An acetylating medium chilled to about 10° C. and consisting of 268 parts of acetic anhydride and 335 parts of 100% sulfuric acid was added to the mixing vessel until the reaction temperature began to rise rapidly. After the rise in temperature had subsided, the remainder of the acetylating medium was added and the reaction was continued for one hour at 33° C. A mixture of 174.5 parts of water, 174.5 parts of glacial acetic acid and 3.35 parts of 100% sulfuric acid was added. The reaction temperature rose to 45° C., then fell to 25° C. The acetylated mixture was removed from the mixing vessel and stored in a glass container at 50° C. for ripening. Part of the mass was removed from the container after 48 hours. The ester was precipitated as a white powder. It contained 41.38% combined acetic acid and was soluble in dimethylformamide, dimethylacetamide and acetone.

The remaining portion of the acetylation mixture was ripened for 168 hours, after which the ester was precipitated as a white powder. It contained 27.9% combined acetic acid and was soluble in dimethylformamide and dimethylacetamide but insoluble in acetone and acetone-water mixtures. Mixtures comprising 10% of this ester and 90% polystyrene were molded as in Example 2. Rods so obtained were dyed to a satisfactory shade as in Example 2.

Example 8

A dimethylthiourethane of cellulose having a degree of substitution of one dimethylthiourethane group per 2.6 anhydroglucose units was acetylated as in Example 3. The acidic esterification mixture was aged at 50° C. An acetyl ester which contained 39.65% of combined acetic acid was precipitated in the form of a white powder from a portion of the mixture removed after the ripening had proceeded for 96 hours. The ester isolated after a ripening time of 300 hours contained 24.7% combined acetic acid.

Rods obtained by molding these esters and mixtures thereof with polystyrene containing from 10 to 25% of the ester, under the conditions of Example 2, were dyed satisfactorily in a dyebath as described in Example 2.

Example 9

A solution was prepared by dissolving a blend of 12 parts of the longest ripened phenylthiourethane of secondary acetyl cellulose of Example 3 with 88 parts of a copolymer of 97% acrylonitrile and 3% vinyl acetate in 567 parts of dimethylacetamide, to obtain a 15% solution of the blend. The solution was cast onto a heated surface to obtain a film.

The film dyed to a deeper shade in a dyebath as in Example 2 than control films of the acrylonitrile-vinyl acetate copolymer.

Example 10

A solution of the blend as in Example 9 was extruded through a slit in an extruding device into a setting bath comprising 60% dimethylacetamide and 40% water. The film was withdrawn from the bath, washed with water and dried. It dyed to a deeper shade in the standardized dyebath than a control film of the copolymer.

Example 11

A solution of the blend as in Example 9 was extruded through a slit in an extrusion device into isopropanol. The film thus formed was taken from the bath, washed with water and dried. It dyed to a deeper shade than a control film of the copolymer, in a bath prepared as described in Example 2.

Example 12

A blend of 88 parts of a finely divided copolymer of 97% acrylonitrile and 3% of vinyl acetate with 12 parts of the phenylthiourethane of cellulose acetate of Example 5 was dissolved in 567 parts of dimethylacetamide. The solution was cast to a film which was dyed to a deeper shade of red in a dyebath as in Example 2 than a control film of the acrylonitrile-vinyl acetate copolymer. Similar films were obtained by extruding dimethylacetamide solutions of the blend into setting baths comprising, respectively, isopropanol and a mixture of 60% dimethylacetamide and 40% water.

Example 13

A blend of 88 parts of a copolymer of 97% acrylonitrile and 3% vinyl acetate with 12 parts of the longest ripened ethylthiourethane of acetyl cellulose of Example 7 was dissolved in 567 parts of dimethylacetamide. Films obtained from the solution were dyed to a deeper shade in a dyebath prepared as in Example 2 than a control film of the acrylonitrile-vinyl acetate copolymer.

In all instances, the yarns, films and other shaped articles comprising a thiourethane of acylated cellulose in accordance with the invention was dyed to a deeper shade in the aqueous bath containing the acid dyestuff than the control article. Shaped articles comprising blends of the cellulose ester thiourethane and cellulose acetate were dyed satisfactorily in the absence of large amounts of special swelling agents or partial solvents for the cellulose acetate. The articles formed from blends of the cellulose ester thiourethanes and acrylonitrile polymers exhibited receptivity for the acid dyes even though, as in the case of the copolymer of acrylonitrile and vinyl acetate specifically exemplified herein, the polymer itself had no affinity for the acid dyes and the control film or other article was not colored or was merely tinted in the dyebath.

In preparing blends of the cellulose ester thiourethanes with organic acid esters of cellulose or the thermoplastic resins, the proportion of the thiourethane may be varied. In general, the blend may contain from 2% to 25% by weight of the cellulose ester thiourethane based on the combined weights of the cellulose ester thiourethane and the other plastic material or materials, such as the cellulose organic ester or thermoplastic resin.

Various changes and modifications may be made in practicing the invention without departing from the spirit and scope thereof and, therefore, the invention is not to be limited except as defined in the appended claims.

I claim:

1. A composition of matter comprising (1) a thiourethane of cellulose acetate, the thiourethane being selected from the group consisting of thiourethane, phenylthiourethane, ethylthiourethane, amylthiourethane, mono-benzyl thiourethane, dibenzyl thiourethane, allylthiourethane, methallylthiourethane, cyclohexylthiourethane, dibutylthiourethane, dimethylthiourethane and pyridylthiourethane and (2) a plastic material selected from the group consisting of polymethylene terephthalates and polymers of mono-ethylenically unsaturated monomers.

2. A composition as defined in claim 1 in which the thiourethane is present in the amount of 2 to 25% by weight.

3. Composition of claim 1 in a solvent therefor.

4. A composition as defined in claim 3 in which the solvent is acetone.

5. A composition as defined in claim 3 in which the solvent is dimethylformamide.

6. A composition as defined in claim 3 in which the solvent is dimethylacetamide.

7. A composition as defined in claim 1 in which the plastic material comprises an initially thermoplastic synthetic resin.

8. A composition as defined in claim 1 in which the plastic material comprises a vinyl resin.

9. A composition as defined in claim 1 in which the plastic material comprises an acrylonitrile polymer.

10. A composition as defined in claim 1 in which the plastic material comprises a copolymer of acrylonitrile containing at least 50% by weight of acrylonitrile.

11. A composition as defined in claim 1 in which the plastic material comprises a copolymer of acrylonitrile containing at least 80% by weight of acrylonitrile.

12. A composition as defined in claim 1 in which the plastic material comprises a copolymer of acrylonitrile containing 85 to 99% acrylonitrile and 1 to 15% of at least one other monoethylenically unsaturated monomer.

13. A composition as defined in claim 1 in which the plastic material comprises a polystyrene.

14. A composition as defined in claim 1 in which the plastic material comprises a copolymer of acrylonitrile and vinyl acetate.

15. A composition as defined in claim 1 in which the plastic material comprises a copolymer of 97% acrylonitrile and 3% vinyl acetate.

No references cited.